United States Patent
Zhang

(10) Patent No.: US 12,537,427 B2
(45) Date of Patent: Jan. 27, 2026

(54) METHOD OF VARNISH TRICKLING TO IMPROVE EMACHINE DURABILITY

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 18/295,696

(22) Filed: Apr. 4, 2023

(65) Prior Publication Data
US 2024/0339902 A1    Oct. 10, 2024

(51) Int. Cl.
*H02K 15/12* (2025.01)
*B05C 5/02* (2006.01)
*B05C 7/02* (2006.01)

(52) U.S. Cl.
CPC ............. *H02K 15/12* (2013.01); *B05C 5/027* (2013.01); *B05C 7/02* (2013.01)

(58) Field of Classification Search
CPC .... H02K 15/02; H02K 2213/03; H02K 15/12; B05C 5/027; B05C 5/022; B05C 7/02; B05D 1/26
See application file for complete search history.

(56) References Cited

U.S. PATENT DOCUMENTS

| | | | |
|---|---|---|---|
| 5,988,530 A * | 11/1999 | Rockefeller | B05B 15/30 239/391 |
| 8,203,251 B2 | 6/2012 | Ishizuka et al. | |
| 10,063,118 B2 | 8/2018 | Yoshida et al. | |
| 10,658,884 B2 | 5/2020 | Honjo | |
| 2005/0280327 A1* | 12/2005 | Neet | H02K 3/345 310/216.011 |
| 2022/0094248 A1 | 3/2022 | Kobayashi et al. | |
| 2023/0109194 A1* | 4/2023 | Kawano | H02K 3/50 310/215 |
| 2023/0170774 A1* | 6/2023 | Blanc | H02K 3/34 310/216.001 |

FOREIGN PATENT DOCUMENTS

| | | | |
|---|---|---|---|
| JP | 2004194398 | 7/2004 | |
| JP | 2011139588 | 7/2011 | |
| JP | 4973420 | 7/2012 | |
| JP | 2016059227 | 4/2016 | |
| JP | 6225624 | 11/2017 | |
| JP | 2020150611 | 9/2020 | |
| WO | WO-2022018336 A1 * | 1/2022 | ............. H02K 1/16 |
| WO | 2022128632 | 6/2022 | |

\* cited by examiner

*Primary Examiner* — Katherine A Bareford
(74) *Attorney, Agent, or Firm* — Burris Law, PLLC

(57) ABSTRACT

A method to apply varnish to a stator of an e-motor includes injecting varnish at an outer diameter of a plurality of wire slots of the stator with flexible nozzle that is disposed between adjacent wire slots. The method further includes injecting varnish at an inner diameter of the wire slots.

11 Claims, 6 Drawing Sheets

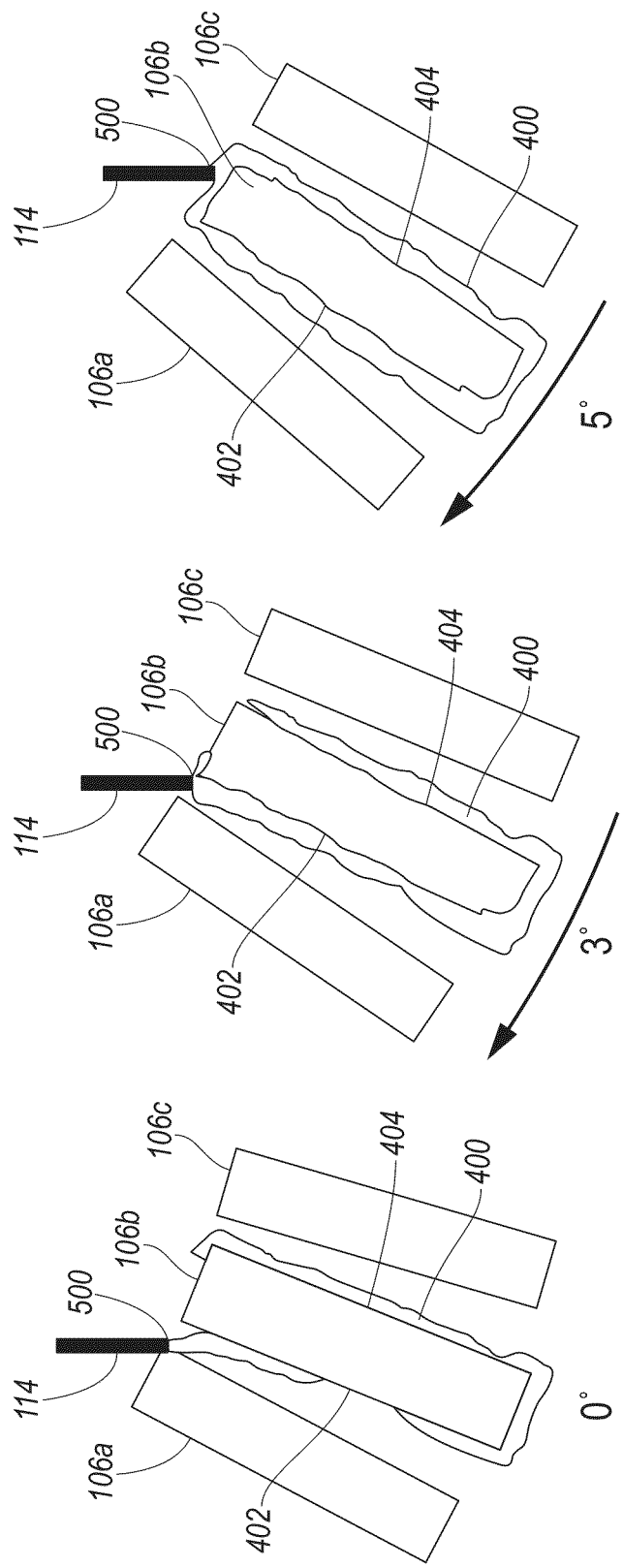

METHOD OF VARNISH TRICKLING TO IMPROVE EMACHINE DURABILITY

FIELD

The present disclosure relates to electric motors. More specifically, the present disclosure relates to maintenance of electric motor components.

BACKGROUND

The statements in this section merely provide background information related to the present disclosure and may not constitute prior art.

Electric propulsion systems in vehicles use electric motors to propel the vehicle as an alternative or in addition to internal combustion engines. Generally, varnish is applied to the electric motors to protect against corrosion and contaminant, thereby improving an operation life of the electric propulsion system. The varnish can be applied with a machine designed to apply the varnish to the various components of the motors. During application, varnish may flow away from an intended location or component that uses the varnish, increasing the total amount of varnish used and potentially disrupting operation of other parts of the electric motor.

The present disclosure addresses challenges related to varnish application to electric motors.

SUMMARY

This section provides a general summary of the disclosure and is not a comprehensive disclosure of its full scope or all of its features.

In one form, a method to apply varnish to a stator of an e-motor includes injecting varnish at an outer diameter of a plurality of wire slots of the stator with flexible nozzle that is disposed between adjacent wire slots. The method further includes injecting varnish at an inner diameter of the wire slots.

In variations of this method, which may be implanted individually or in any combination: the injection of the varnish at the outer diameter defines a vertical axis with a center of the stator and the injection at the inner diameter occurs at an angle greater than 0° relative to the vertical axis; the injection at the inner diameter occurs at an angle of about 30° relative to the vertical axis; a nozzle tip of the flexible nozzle is inserted at a distance from a top of the wire slots equal to about ⅔ of a slot pitch at the top of the wire slots; the flexible nozzle applies varnish to a first side of a slot and then a second side of the slot as the stator rotates; the injection of the varnish at the inner diameter is supplied with a straight nozzle; a tip of the straight nozzle is positioned at a distance greater than zero from the inner diameter of the stator; the tip of the straight nozzle is positioned at a distance of about 1 mm from the inner diameter of the stator; the straight nozzle applies varnish to a first side of a slot and then a second side of the slot as the stator rotates; the stator rotates at a speed of about 10 rpm; over 30% of the wire slots are filled with varnish; and both sides of a wire slot are fully covered after one rotation of the stator.

In another form, a method to apply varnish to a stator of an e-motor, includes injecting varnish at an outer diameter of a plurality of wire slots of the stator with a flexible nozzle disposed between adjacent wire slots and injecting varnish at an inner diameter of the wire slots. The injection of the varnish at the outer diameter defines a vertical axis with a center of the stator and the injection at the inner diameter occurs at an angle of about 30° relative to the vertical axis.

In variations of this method, which may be implemented individually or in any combination: a nozzle tip of the flexible nozzle is inserted at a distance from a top of the wire slots equal to about ⅔ of a slot pitch at the top of the wire slots; the injection of the varnish at the inner diameter is supplied with a straight nozzle; the tip of the straight nozzle is positioned at a distance of about 1 mm from the inner diameter of the stator; over 30% of the wire slots are filled with varnish; and both sides of a wire slot are fully covered after one rotation of the stator.

In yet another form of the present disclosure, an assembly to apply varnish to a stator of an e-motor includes a first injector arranged at an outer diameter of a plurality of wire slots of the stator. The first injector is a flexible nozzle disposed between adjacent slots. The assembly further includes a second injector arranged at an inner diameter of the plurality of wire slots of the stator.

In variations of this form, which may be implemented individually or in any combination, the first injector is arranged at a top of the outer diameter, defining a vertical axis with a center of the stator, and the second injector is a straight injector arranged at a position of about 30° relative to the vertical axis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6A-6C illustrate the application of varnish with the inner injector shown in FIG. 5.

Figure 1:
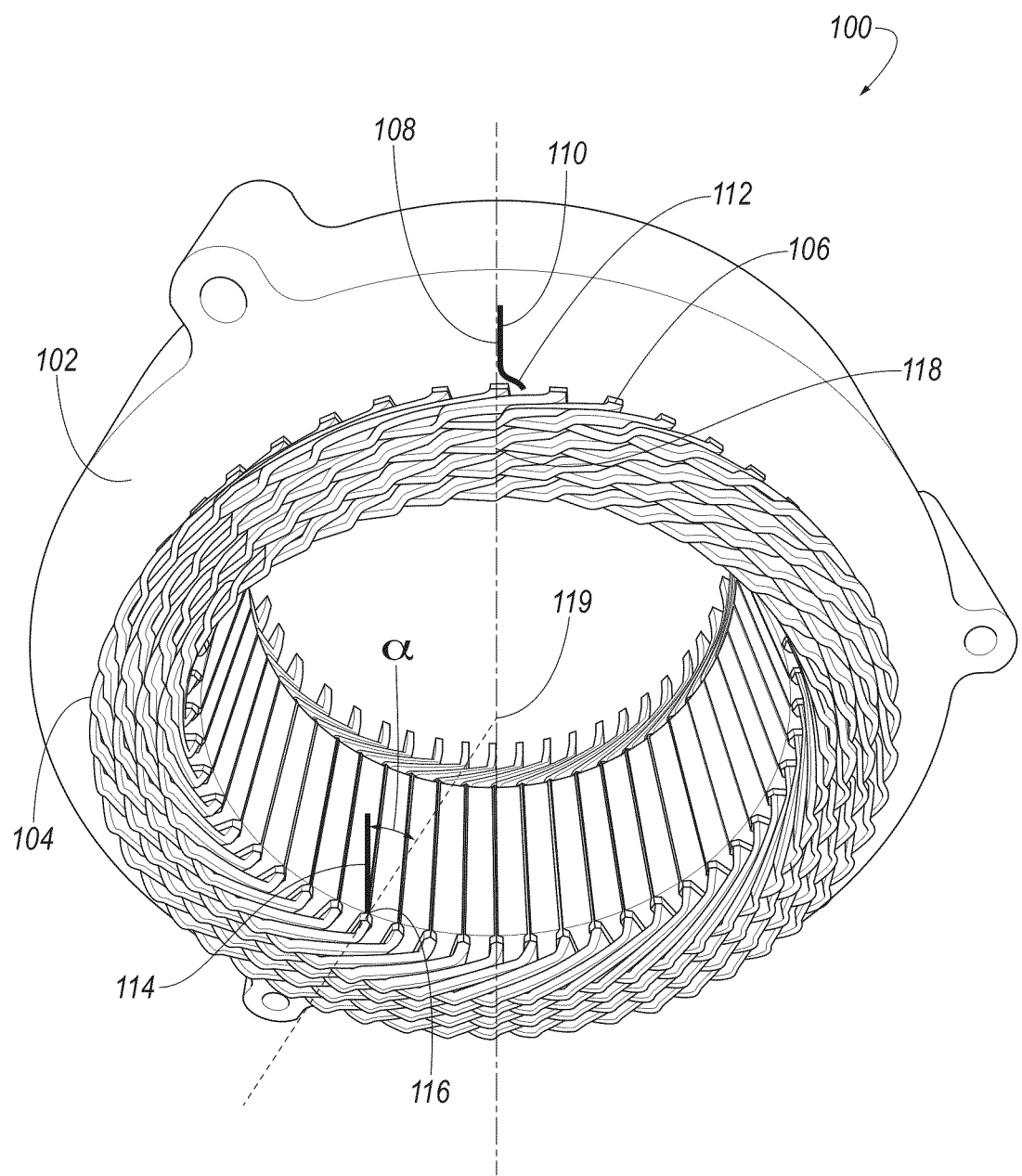
FIG. 1 is a perspective view of a stator for an electric motor in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Among other components, an electric motor includes a stator that is a stationary component generating an electromagnetic field and a rotor which rotates relative to the stator due to the electromagnetic field. In one example application, the electric motor is a component of an electric propulsion for a motor vehicle. The electric motor propels the motor vehicle by rotating one or more wheels of the motor vehicle. In one example, the electric motor is a sole propulsion of the vehicle, such as in a fully electric vehicle. Alternatively, the electric motor can be part of a hybrid propulsion that includes an internal combustion engine, such as in a hybrid-electric vehicle.

With reference to FIG. 1, an example of a stator 100 for an electric motor is illustrated and includes a stator core 102 and a plurality of wires 104. In one form, the stator core 102 defines a plurality of slots 106, and each slot 106 includes one or more wires from among the plurality of wires 104. The wires 104 are formed of an electrically conducting material such as copper. With the wires 104 arranged in the slots 106, electric current flowing through the wires 104 generates an electromagnetic field that drives the rotor.

To inhibit corrosion or deterioration of electrical properties of the wires 104 and to improve durability of the stator by holding stator laminates and/or copper wires and/or intermediate paper layers together in a generally rigid manner, a varnish is applied to the stator during assembly of the electric motor. The varnish is typically applied to an outermost surface of the stator core 102, and capillary action directs the flow of the varnish through the slot 106 and onto the wires 104, as well as into a gap between a surface of the slot 106 and an intermediate paper layer 200 (FIG. 2) surrounding the wires 104. Specifically, the varnish flows through spaces (i.e., capillaries) of the slot 106 by adhesion, viscosity, and/or surface tension without significant influence by, or even against, the force of gravity. The stator core 102 is rotated such that a varnish tricking system with an outer injector 108 and an inner injector 114 applying the varnish can inject the varnish to each of the slots 106 and the wires 104 therein. Controlling flow of varnish into the slots 106 may reduce a total amount of varnish used and improve manufacturing of the electric motor.

Figure 2:
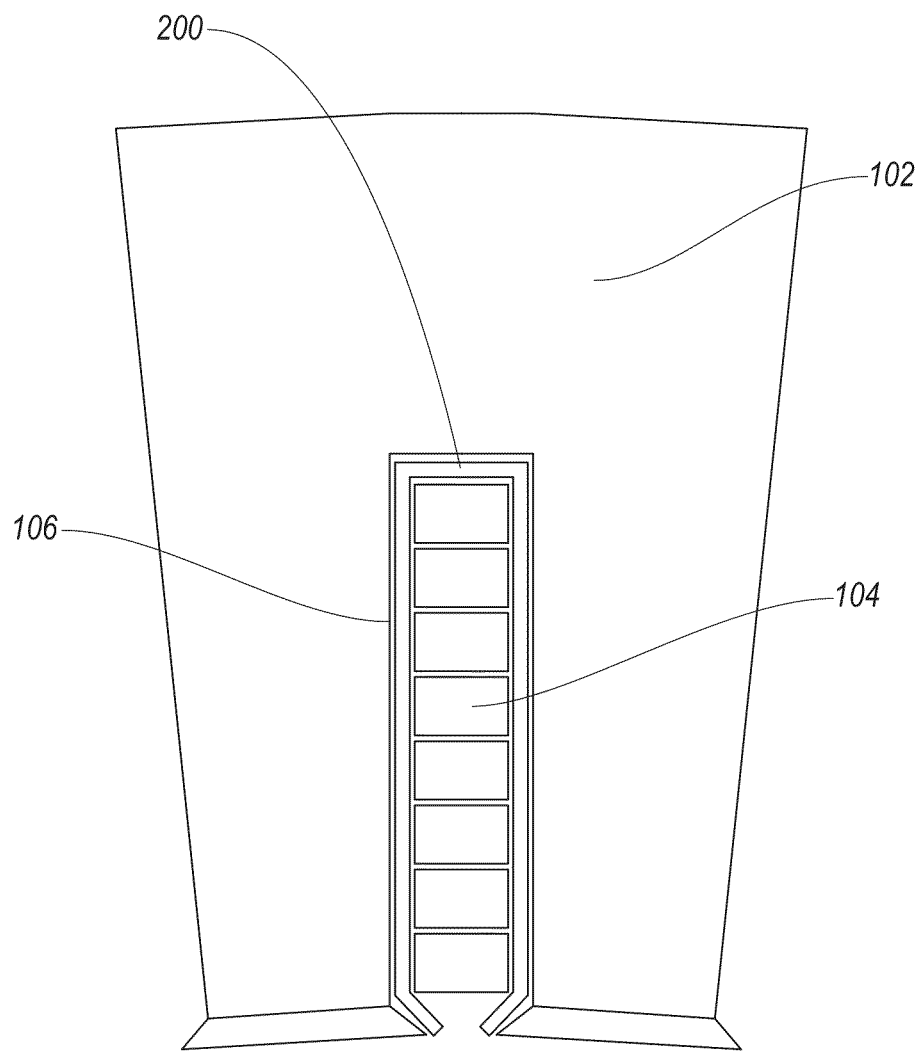
FIG. 2 is a close-up view of a slot of the stator shown in FIG. 1.

With further reference to FIG. 2, a partial cross-section illustrating one of the slots 106 of the stator core 102 is shown. As described above, one or more wires 104 among the plurality of wires 104 are disposed in the slot 106 defined in the stator core 102. An insulating layer such as the paper layer 200 is disposed in the slot 106 between the wires 104 and the stator core 102. The insulating layer in this form is a paper or other porous and/or fibrous material that absorbs and transmits varnish through the fibers of the material. The paper layer 200 extends around the wires 104 and axially through the slot 106, separating the wires 104 from direct contact with the stator core 102.

For reference, as shown in FIG. 1, a vertical line 118 extends across the front surface of the stator core 102, and a line 116 extends from a tip 500 (FIG. 5) of the inner injector 114 across the front surface of the stator core 102 and intersects the line 118 at a center 119. The outer injector 108 is positioned with a suitable fixture and is located at the top of the stator 100. The outer injector 108 is parallel to the slot positioned below it and includes a straight portion 110 and a flexible portion 112. The inner injector 114 is a vertical injector positioned with a suitable fixture, arranged parallel to the line 118, that is located at the bottom of the stator 100, and is offset towards the left from the outer injector 108. The lines 118 and 116 further define an angle ($\alpha$). In some forms, the angle ($\alpha$) is about 30°.

In the following, the slot 106 may be identified with an "-a" suffix, a "-b" suffix, and a "-c" suffix when multiple slots are shown in the figure.

Figure 3:
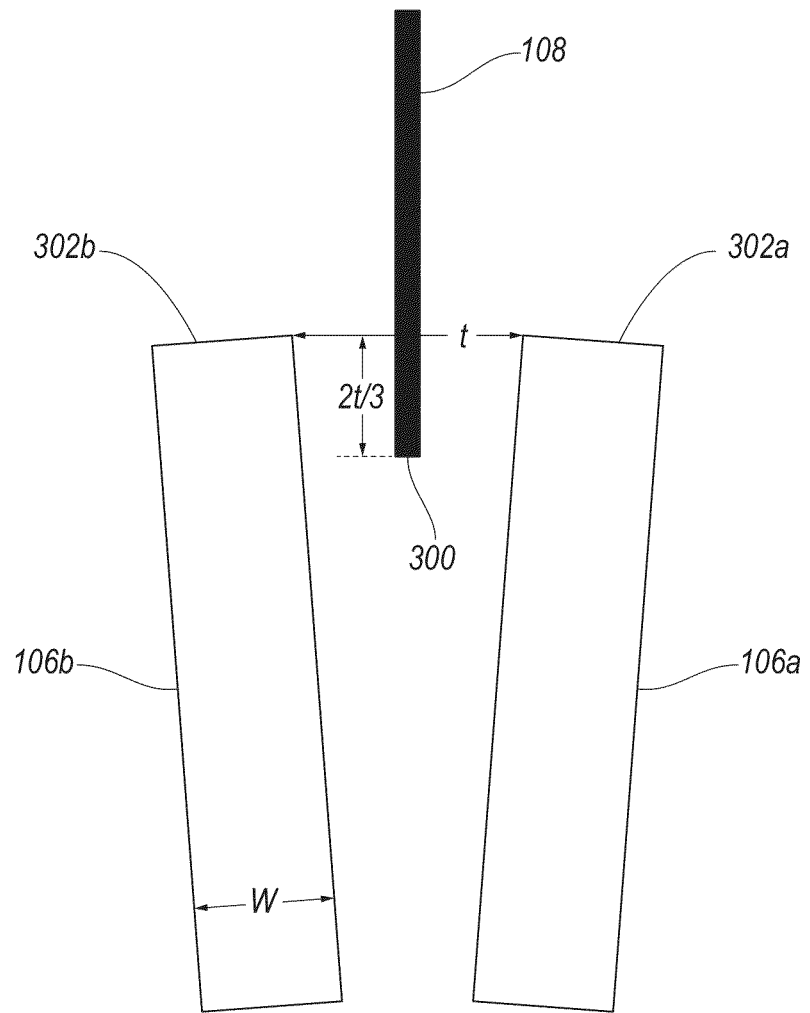
FIG. 3 illustrates an outer injector in relation to a pair of slots of the stator shown in FIG. 1 in accordance with the teachings of the present disclosure.

Referring now to FIG. 3, Under a static condition (no stator rotation), the outer injector 108 is inserted into a gap between two adjacent slots 106a and 106b. The distance from a tip 300 of the outer injector 108 to a top 302a of the slot 106a and a top 302b of the slot 106b slot is equal to ⅔ of a slot pitch (t).

Figure 4:
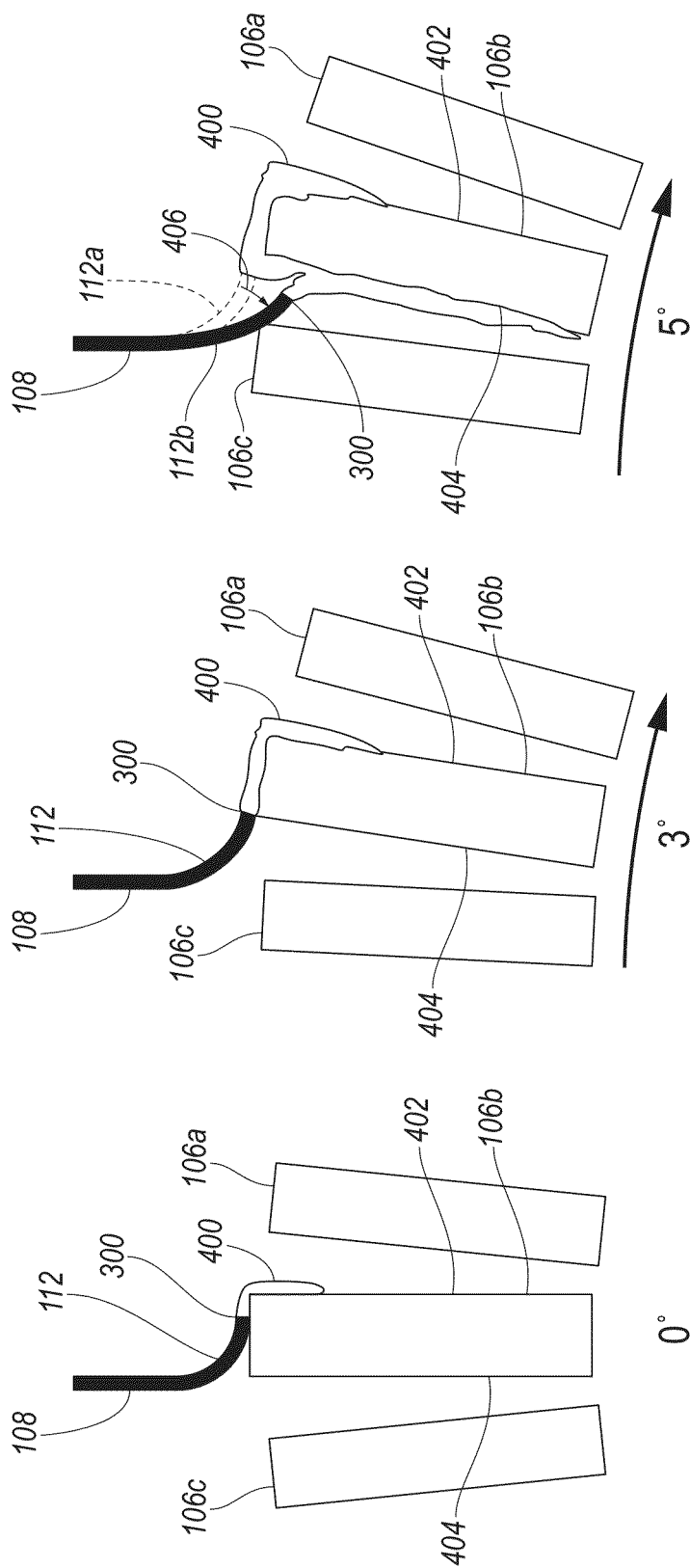
FIGS. 4A-4C illustrate the application of varnish with the outer injector shown in FIG. 3.

Referring to FIGS. 4A-4C, a varnish stream 400 from the outer injector 108 flows onto a first side 402 of the slot 106b as the stator 100 rotates in a clockwise direction. In certain forms, the stator rotates at about 10 rpm. As the stator 100 rotates (FIG. 4A), the flexible portion 112 bends so that the tip 300 of the injector 108 is at top right edge of the slot 106b, so that varnish 400 flows to a first side 402 of the slot 106b in the gap between the slots 106a and 106b. As the stator 100 continues to rotate, for example, after about 3° (FIG. 4B), the tip 300 of the injector 108 is at the top left edge of the slot 106b. Hence, varnish 400 is delivered on the top side of the slot 106b. As the stator 100 further rotates, for example, after 5° (FIG. 4C), the tip 300 of the injector 108 disengages from the slot 106b and engages with the slot 106c. Accordingly, the flexible portion 112 moves from a position 112a to a position 112b, as indicated by the arrow 406. As such, the tip 300 of the injector 108 delivers varnish 400 to a second side 404 of the slot 106b. Hence, after the tip 300 of the injector 108 sweeps across the slot 106b, the top side, the first side 402 and the second side 404 are filled with varnish 400.

Figure 5:
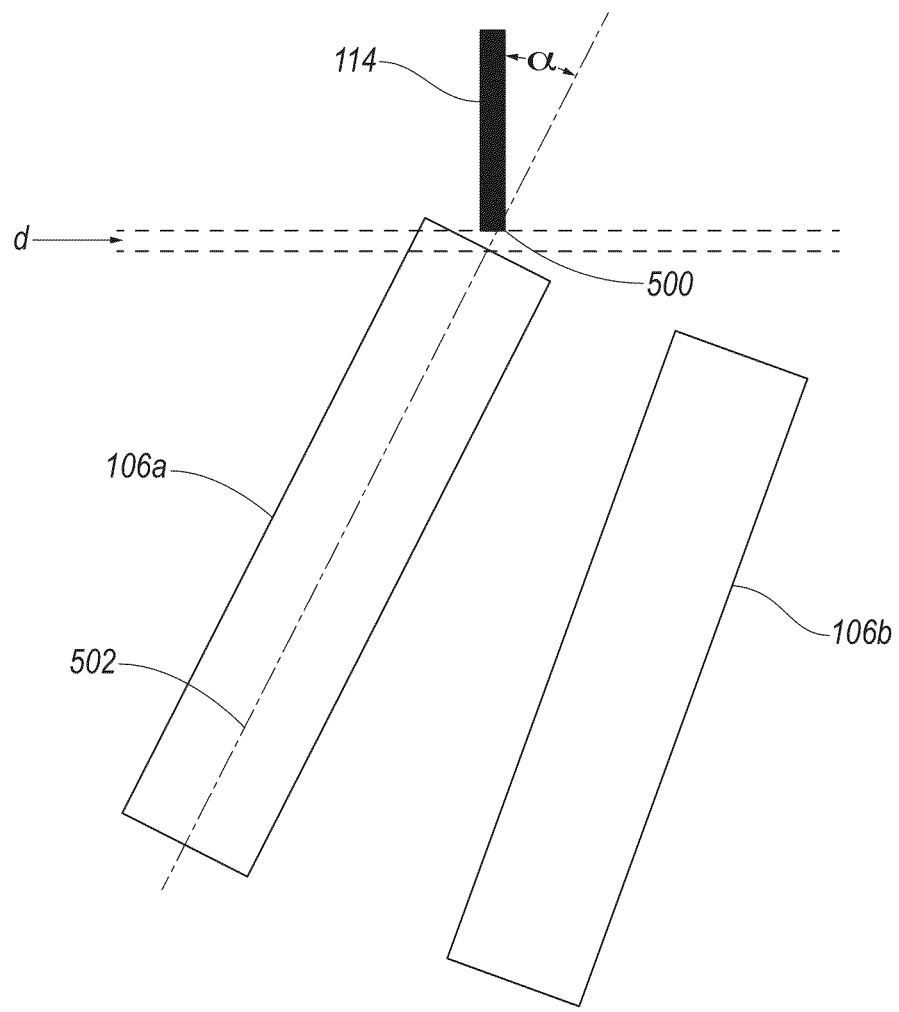
FIG. 5 illustrates an inner injector in relation to a pair of slots of the stator shown in FIG. 1.

Turning now to FIG. 5, a straight and shorter nozzle is employed for the inner injector 114. The inner injector 114 is parallel to the vertical line 118 (FIG. 1) and forms an angle ($\alpha$) of about 30° with respect a line 502 extending through the slot 106a positioned below the inner injector 114. The distance (d) from the tip 500 of the inner injector 114 to the top center of the slot 106a is in some forms about 1 mm.

FIGS. 6A-6C show the application of a varnish stream from the inner injector 114 as the stator 100 (FIG. 1) rotates in a clockwise direction. As the tip 500 of the inner injector reaches the top right edge of the slot 106a, varnish 400 exits the tip 500 flows onto the first side 402 of the slot 106b (FIG. 6A). As the stator 100 continues to rotate about 3°, the tip 500 of the inner injector 114 moves towards the top left edge of the slot 106b (FIG. 6B) while a portion of the varnish 400 is continuously delivered to the first side 402 of the slot 106b and another portion of varnish 400 is delivered on the top side of the slot 106b. As the stator 100 rotates further about 5°, the tip 500 of the inner injector reaches the top right edge of the slot 106b and varnish is supplied to top right corner of the slot 106b. After the inner injector 114 sweeps across the slot 106b, both injections from outer injector 108 and the inner injector 114 are completed for one stator rotation. As such, all surfaces of slot 106b are fully covered with varnish 400, as shown in FIG. 6C.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Further, the terms "front", "inner", and "outer are terms used relative to the orientation of the stator core 102. Thus, "front" refers to the forward surface of the stator 100 shown in FIG. 1, "inner" refers to the interior diameter of the stator core 102, and "outer" refers to the outer diameter of the stator core 102.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method to apply varnish to a stator of an electric motor, the method comprising:
    injecting varnish at an outer diameter of a plurality of wire slots of the stator with a flexible nozzle disposed between adjacent wire slots; and
    injecting varnish at an inner diameter of the wire slots,
    wherein a nozzle tip of the flexible nozzle is inserted into a gap between the adjacent wire slots under a static condition.

2. The method of claim 1, wherein the injection of the varnish at the outer diameter defines a vertical axis with a center of the stator and the injection at the inner diameter occurs at an angle greater than 0° relative to the vertical axis.

3. The method of claim 1, wherein the nozzle tip of the flexible nozzle is inserted into a gap between the adjacent wire slots a distance equal to about ⅔ of a slot pitch at a top of the adjacent wire slots.

4. The method of claim 1, wherein the flexible nozzle applies varnish to a first side of a slot and then a second side of the slot as the stator rotates.

5. The method of claim 1, wherein the injection of the varnish at the inner diameter is supplied with a straight nozzle.

6. The method of claim 5, wherein the straight nozzle applies varnish to a first side of a slot and then a second of the slot as the stator rotates.

7. The method of claim 1, wherein both sides of a wire slot are fully covered after one rotation of the stator.

8. A method to apply varnish to a stator of an electric motor, the method comprising:
    injecting varnish at an outer diameter of a plurality of wire slots of the stator with a flexible nozzle disposed between adjacent wire slots, the injection of the varnish at the outer diameter defining a vertical axis with a center of the stator; and
    injecting varnish at an inner diameter of the wire slots, the injection at the inner diameter of the wire slots occurring at an angle of about 30° relative to the vertical axis,
    wherein a nozzle tip of the flexible nozzle is inserted into a gap between the adjacent wire slots under a static condition.

9. The method of claim 8, wherein the nozzle tip of the flexible nozzle is inserted into a gap between the adjacent wire slots a distance equal to about ⅔ of a slot pitch at a top of the adjacent wire slots.

10. The method of claim 8, wherein the injection of the varnish at the inner diameter is supplied with a straight nozzle.

11. The method of claim 8, wherein both sides of a wire slot are fully covered after one rotation of the stator.

* * * * *